United States Patent [19]

Glaser

[11] 4,445,062
[45] Apr. 24, 1984

[54] ROTOR ASSEMBLY HAVING ANCHORS WITH UNDULATING SIDES

[75] Inventor: Jerry Glaser, Playa del Rey, Calif.

[73] Assignee: The Garrett Corporation, Los Angeles, Calif.

[21] Appl. No.: 973,345

[22] Filed: Dec. 26, 1978

[51] Int. Cl.³ .......................................... H02K 21/12
[52] U.S. Cl. .................................................. 310/156
[58] Field of Search .............. 310/156, 261, 262, 264, 310/265, 218

[56] References Cited

U.S. PATENT DOCUMENTS

| | | | |
|---|---|---|---|
| 902,019 | 10/1908 | Sulzberger | 310/218 X |
| 2,719,931 | 10/1955 | Kober | 310/156 |
| 2,739,253 | 3/1956 | Plumb | 310/156 |
| 3,083,311 | 3/1963 | Krasnow | 310/156 |
| 4,117,360 | 9/1978 | Richter | 310/156 X |

FOREIGN PATENT DOCUMENTS 2659650 11/1978 Fed. Rep. of Germany ...... 310/156

*Primary Examiner*—Mark O. Budd
*Attorney, Agent, or Firm*—Fay I. Konzem; Albert J. Miller

[57] ABSTRACT

A rotor assembly having wedge-shaped permanent magnets and anchors with undulating sides for attaching the rotor hub to the pole bodies.

4 Claims, 5 Drawing Figures

ROTOR ASSEMBLY HAVING ANCHORS WITH UNDULATING SIDES

BACKGROUND OF THE INVENTION

This invention relates to subject matter disclosed in concurrently filed patent application Ser. No. 973,346, entitled "Wedge-Shaped Permanent Magnet Rotor Assembly" by Frederick B. McCarty and Alexander Silver; Ser. No. 973,377, entitled "Rotor Assembly Having Rectangularly Shaped Tongues", by Alexander Silver; and Ser. No. 973,343, entitled "Rotor Assembly with Magnet Cushions", by Frederick B. McCarty, Alexander Silver and Lyman R. Burgmeier.

This invention relates to high speed permanent magnet rotor assemblies, and more particularly, to rotor assemblies having wedge-shaped permanent magnets and anchors with undulating sides for attaching the pole bodies to the rotor's hub.

In the art, methods have been developed to join the non-magnetic hub to the magnetic pole pieces in a rotor assembly. One such method is the hot isostatic pressure (HIP) bonding process which is performed under extreme pressure (circa 18,000 p.s.i.a.) and at elevated temperatures (circa 2200° F.). Another method used to join the non-magnetic and magnetic rotor materials together is furnace brazing, which is also performed at elevated temperatures (circa 1860° F.). The brazing and (HIP) bonding techniques do not permit optimizing the heat treatment of the structural steel parts for maximum strength. The resultant brazed/bonded structure is not as strong as it could be.

SUMMARY OF THE INVENTION

The permanent magnet rotor assembly, in accordance with the invention, includes outwardly converging wedge-shaped permanent magnets retained between inwardly converging wedge-shaped support members. The rotor hub and support members are attached by means of anchors with undulating sides.

A principal advantage of the present invention is that the magnets are held in place between the support members by their wedge-shape. Also, the rotor hub is attached to the support members by means of anchors with undulating sides so that the non-magnetic hub and the magnetic support members or pole bodies are mechanically joined without the needs for the high temperature brazing or high pressure (HIP) bonding methods of joining the two dissimilar materials, thereby maintaining the structural integrity of the materials.

DETAILED DESCRIPTION OF THE PREFERRED EMBODIMENT

Figure 1:
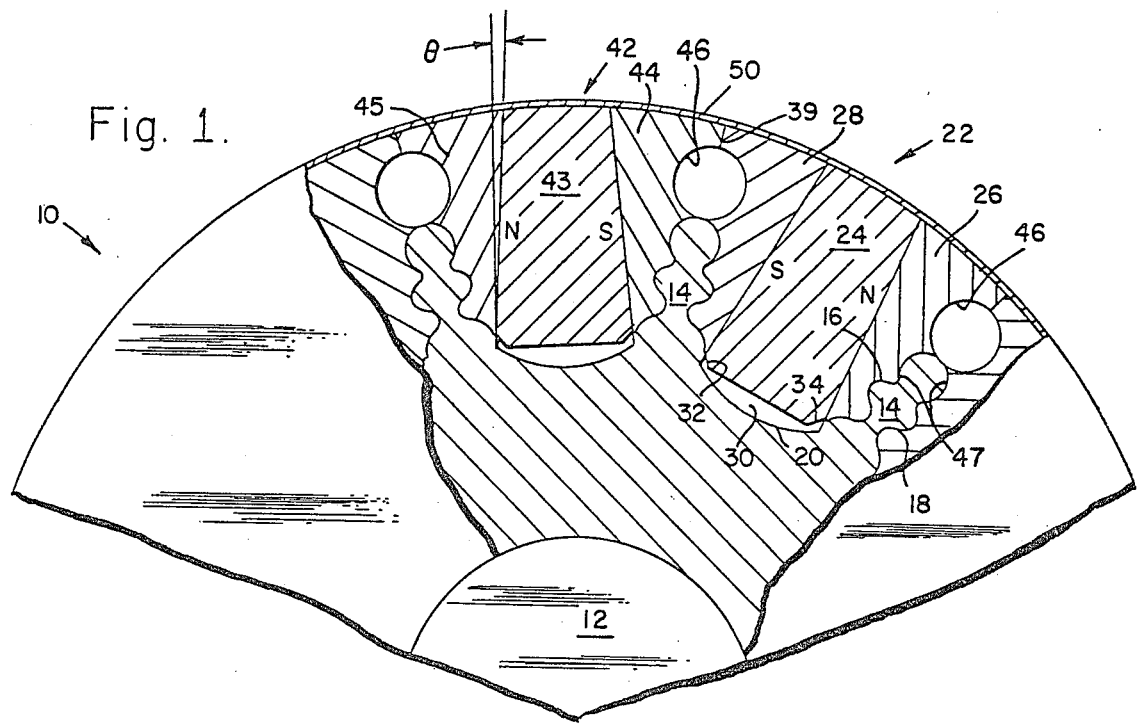
FIG. 1 is a cross-section view of the rotor assembly of the present invention.

Referring now to FIG. 1, a permanent magnet rotor assembly 10 includes a generally cylindrical hub 12 with a plurality of equally spaced tongues 14 radially extending outward around the periphery thereof. The tongues 14 are fir tree shaped with the undulating sides 16 and 18. Disposed between each pair of adjacent tongues 14 on the outer periphery of the hub 12 is a concave recess 20. The hub 12 consists of a non-magnetic material.

A magnet-support member assembly 22 is located between each pair of the undulating tongues 14 and around the periphery on the hub 12. The assembly 22 consists of an outwardly converging wedge-shaped permanent magnet 24 with identical support members 26 and 28 affixed to either side of the magnet 24. The support members 26 and 28 consist of a ferromagnetic material.

The outwardly converging wedge-shaped permanent magnets 24 are shorter in length than the distance from the base of the recess 20 to the outer periphery of the rotor assembly 10 thereby forming a gap 30 between the base of the magnet 24 and the base of the recess 20. The purpose of the gap is to facilitate assembly, and to cool the rotor 10 by permitting cooling air to flow through the rotor assembly. The base of the magnets 24 may have slant corners 32 and 34 for easy insertion of the magnet 24 into the recess 20.

The size of the angle formed between the sides of the magnets 24 and a plane parallel to a central radius through the magnet is critical and should be slightly less than the angle of friction. This angle is experimentally determined and is the maximum angle at which a locking wedge action is achieved for the material and conditions pertinent to a given design. If the angle is too large the magnets will not remain locked in place after the rotor ceases to rotate and if the angle is too small, lateral crushing forces may cause the magnet to fracture. Therefore, there is a critical range within which the locking angle $\theta$ must lie. It has been found that the size of the locking angle $\theta$ should be between 2 to 9 degrees, preferably 6 to 8 degrees.

Figure 2:
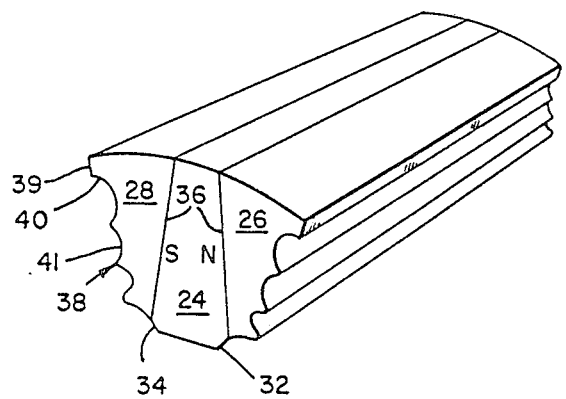
FIG. 2 is a perspective drawing showing the magnet and support member assembly of FIG. 1.

FIG. 2 is a perspective view showing the magnet-support member assembly 22. The inwardly converging wedge-shaped support members 26 and 28 have a smooth side 36 which fits flush against the magnet 24. A second side 38 of the support members has a flat surface 39, a semi-circular groove 40, and an undulating portion 41.

Adjacent the magnet-support member assembly 22 is a second magnet-support member assembly 42 which includes an outwardly converging wedge-shaped permanent magnet 43 and inwardly converging wedge-shaped support members 44 and 45 affixed to either side of the magnet 43. The magnet-support member assembly 42 is identical to the assembly 22. A plurality of such assemblies are located around the outer periphery of the hub 12.

When the rotor 10 is assembled, the side 38 of the support member 28 is in contact with the support member 44 at the flat surface 39, thereby forming a circular hole 46 and a groove 47 with undulating sides. The circular hole 46 reduces the rotor's mass and allows air to flow through the rotor 10 to reduce the surface temperature thereof. The undulating portions of the support members 28 and 44 form a groove 47 which interlocks around the undulating sides 16 and 18 of the tongues 14. The undulating sides 16 and 18 of the tongue 14 allow more surface area to be in contact with the support members 28 and 44 than a smooth sided tongue would; therefore, the tongues 14 with undulating sides are superior in retention of the support members. Also, no high stress concentration is present in the undulating sides 16 and 18 of the tongues 14 because of the curvilinearity of the sides as opposed to sides with sharp corners.

A thin hoop 50 which is heat shrunk upon the periphery of the magnets and support members functions as an electric damper to intercept and diminish the flux harmonics caused by the stator and penetrating into the support members and the magnets. Reflecting eddy currents are produced in the hoop 50, thereby shielding the permanent magnets and the support members. The hoop 50 has a minor structural function, providing a retaining force over the peripheral contact with the magnets and support members. This retaining force is small and merely supplemental to the retaining provided by the hub 12. The hoop 50 consists of a high strength, non-magnetic material preferably having a low resistivity, such as a beryllium copper alloy.

The rotor 10 is constructed by first affixing one side of the magnet 24 to the side 36 of the support member 26 and the other side of the magnet 24 to the side 36 of the support member 28 by means of an adhesive. Next, the side 38 of the support members 26 and 28 is machined to form the semi-circular groove 40 and the undulating portion 41. Next, the magnet-support member assembly 22 is inserted between the tongues 14 and the outer peripheral surface of the magnets 24 and the support members 26 and 28 are ground so that the surfaces smoothly blend. Finally, the hoop 50 is shrunk around the outer periphery of the magnet-support member assemblies 22.

It is difficult to machine accurate wedge-shaped magnets and their mating grooves because of the brittle nature of the magnet material and the errors in machining a wedge-shaped port and cavity. By first machining the magnet 24 and then affixing the support members 26 and 28 to the sides of the magnet 24 the shape of the support members 26 and 28 (namely, the outer edge 38) can be precisely machined since the support members consist of a ferromagnetic material.

Figure 4:
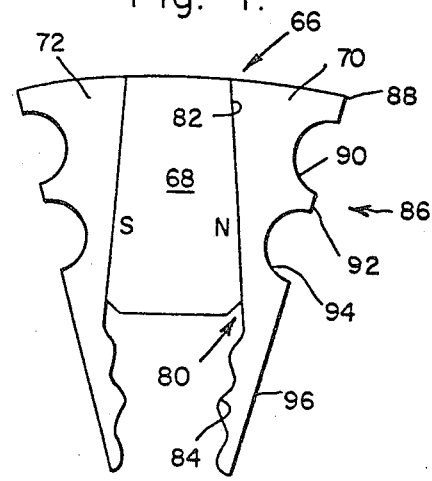
FIG. 4 shows the magnet-support member assembly of FIG. 3.
Figure 3:
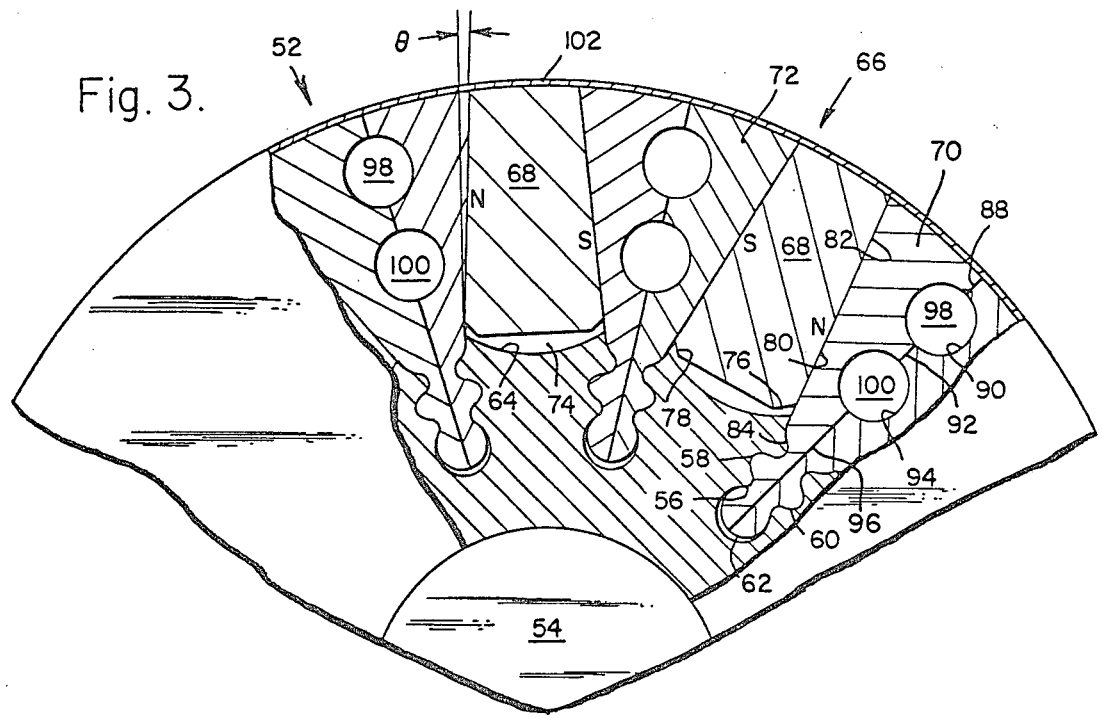
FIG. 3 illustrates an alternate embodiment of the rotor assembly of the present invention.

FIGS. 3 and 4 show a permanent magnet rotor assembly 52 which includes a generally cyclindrical hub 54 with a plurality of equally spaced grooves 56. The grooves 56 have undulating sides 58 and 60 terminating in a base 62. The hub 54 also has a plurality of concave recesses 64 located between the adjacent grooves 56. The hub 54 consists of a non-magnetic material.

A plurality of magnet-support member assemblies 66 are located around the outer periphery of the hub 54. The assembly 66 consists of an outwardly converging wedge-shaped permanent magnet 68 with identical support members 70 and 72 affixed to either side of the magnet 68.

The outwardly converging wedge-shaped permanent magnets are shorter in length than the distance from the base of the recess 64 to the outer periphery of the rotor assembly 10, thereby forming a gap 74 between the base of the magnet 68 and the base of the recess 64. The purpose of the gap is to facilitate assembly, and to cool the rotor 10 by permitting cooling air to flow through the rotor assembly. The base of the magnets 68 may have slant corners 76 and 78 for easy insertion of the magnets 68 into the recess 64.

FIG. 4 is a cross-section view showing the magnet-support member assembly 66 of FIG. 3. The inwardly converging wedge-shaped support members 70 and 72 have a side 80 with a smooth section 82, fitting flush against the side of the magnet 68 and an undulating section 84 extending beyond the base of the magnet 68. The support members 70 and 72 have another side 86 having a flat or smooth portion 88, a semi-circular groove 90, a flat portion 92, another semi-circular groove 94 and a flat portion 96.

Referring to both FIGS. 3 and 4, when the rotor 52 is assembled, the flat portions 88, 96, and 96 of the support members 70 and 72 make contact with the flat portions of their adjacent support members (as described for FIGS. 1 and 2) thereby forming circular holes 98 and 100. The holes 98 and 100 reduce the rotor's mass and allow air to flow through the rotor assembly 52 to reduce the surface temperature thereof. The holes formed between the support members can be of a variety of shapes, the circular holes 98 and 100 as shown in FIG. 3 are easier to fabricate than the oblong-shaped holes shown in FIG. 5. The oblong-shaped holes remove more mass from the rotor assembly and therefore a higher tip speed limit results. The size and location of the holes is established with regard to magnetic and structural considerations.

The smooth sections 82 of the side 80 of the support members 70 and 72 is in contact with the magnet 68 and the undulating section 84 which extends past the base of the magnet 68 and interlocks with the undulating sides 58 and 60 of the groove 56.

A thin electrically dampening hoop 102 is shrunk around the periphery of the rotor assembly 52. The hoop 102 consists of a non-magnetic material such as a beryllium copper alloy.

Figure 5:
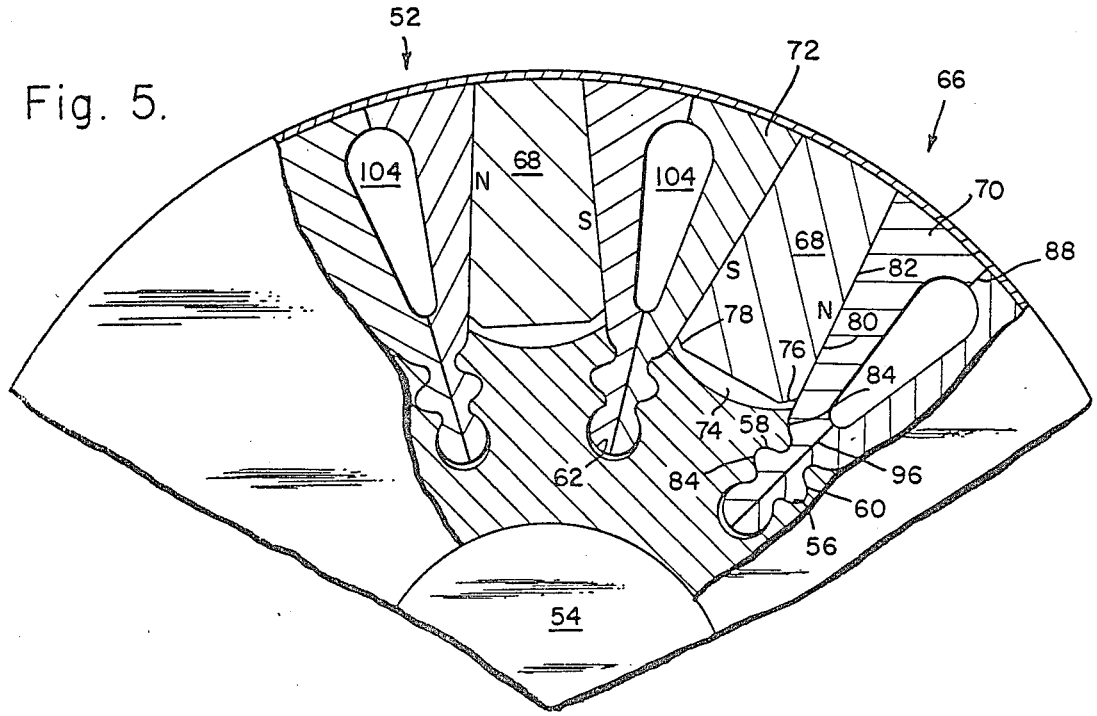
FIG. 5 shows a variation of the rotor assembly of FIG. 3.

The rotor assembly 52 of FIGS. 3 and 5 is constructed by first affixing one side of the magnet 68 to the smooth section 82 of the side 80 of the support member 70 and the other side of the magnet 68 to the smooth section 82 of the side 80 of the support member 72 by means of an adhesive. Next, the undulating section 84 of the side 80 is machined along with the semi-circular grooves 90 and 94 on the side 86 of the support members 70 and 72. Then, the magnet support member assemblies 66 are inserted around the outer periphery of the hub 54, with the undulating sections 84 of the support members 70 and 72 interlocking into the grooves 56 of the hub 54. The outer peripheral surface of the magnets 68 and the support members 70 and 72 are ground so that the surfaces smoothly blend. Finally, the hoop 102 is shrunk around the outer periphery of the magnet-support member assemblies.

While specific embodiments of the invention have been illustrated and described, it is to be understood that these embodiments are provided by way of example only and the invention is not to be construed as being limited thereto, but only by the proper scope of the following claims:

What is claimed is:

1. A rotor comprising:
  a hub having radially extending tongues with undulating sides equally spaced around the outer periphery of said hub;
  a plurality of wedge-shaped permanent magnets having outwardly converging sides and radially disposed around the outer periphery of said hub;
  a plurality of inwardly converging wedge-shaped support members, one support member being affixed to each of the sides of said permanent magnets;
  one side of each of said support members having an undulating groove into which the tongues of said hub interlock;

said sides of said magnets forming an angle within the range of 2 to 9 degrees with a plane parallel to a central radius through said magnet such that the magnets are locked in place after said rotor ceases to rotate and the magnets will not fracture due to excessive compressive forces applied to the sides of said magnets.

2. A rotor comprising:

a hub having radially extending tongues with undulating sides equally spaced around the outer periphery of said hub;

a plurality of wedge-shaped permanent magnets having outwardly converging sides and radially disposed around the outer periphery of said hub;

a plurality of inwardly converging wedge-shaped support members, one support member being affixed to each of the sides of said permanent magnets;

one side of each of said support members having an undulating groove into which the tongues of said hub interlock;

said sides of said magnets forming an angle within the range of 6 to 8 degrees with a plane parallel to a central radius through said magnet such that the magnets are locked in place after said rotor ceases to rotate and the magnets will not fracture due to excessive compressive forces applied to the sides of said magnets.

3. A permanent magnet rotor comprising:

a hub having a plurality of grooves with undulating sides equally spaced around the outer periphery of said hub;

a plurality of magnet support member assemblies disposed around the outer periphery of said hub;

each of said assemblies having a wedge-shaped permanent magnet with two outwardly converging sides and a first and second wedge-shaped support member with a first and second inwardly converging side;

the first side of the support member having a flat portion which is affixed to the side of said permanent magnet and an undulating portion for interlocking with the grooves of said hub;

the second side of the support member having at least one semi-circular groove;

the semi-circular grooves of adjoining support members forming a circular hole for lightening and cooling the rotor;

said sides of said magnets forming an angle within the range of 2 to 9 degrees with a plane parallel to a central radius through said magnet such that the magnets are locked in place after said rotor ceases to rotate and the magnets will not fracture due to excessive compressive forces applied to the sides of said magnets.

4. A permanent magnet rotor comprising:

a hub having a plurality of grooves with undulating sides equally spaced around the outer periphery of said hub;

a plurality of magnet support member assemblies disposed around the outer periphery of said hub;

each of said assemblies having a wedge-shaped permanent magnet with two outwardly converging sides and a first and second wedge-shaped support member with a first and second inwardly converging side;

the first side of the support member having a flat portion which is affixed to the side of said permanent magnet and an undulating portion for interlocking with the grooves of said hub;

the second side of the support member having at least one semi-circular groove;

the semi-circular grooves of adjoining support members forming a circular hole for lightening and cooling the rotor;

said sides of said magnets forming an angle within the range of 6 to 8 degrees with a plane parallel to a central radius through said magnet such that the magnets are locked in place after said rotor ceases to rotate and the magnets will not fracture due to excessive compressive forces applied to the sides of said magnets.

* * * * *